United States Patent [19]

Alquist

[11] 3,783,619
[45] Jan. 8, 1974

[54] OXIDATIVE CATALYTIC CONVERTER
[75] Inventor: Henry E. Alquist, Bartlesville, Okla.
[73] Assignee: Phillips Petroleum Company, Bartlesville, Okla.
[22] Filed: May 3, 1972
[21] Appl. No.: 249,787

[52] U.S. Cl. .................... 60/288, 23/288 F, 60/291, 60/299
[51] Int. Cl. ............................................ F01n 3/14
[58] Field of Search ...................... 60/288, 291, 287, 60/284, 299; 23/288 F; 423/212, 213, 214

[56] References Cited
UNITED STATES PATENTS

| 3,144,309 | 8/1964 | Sparrow | 60/288 |
| 3,180,712 | 4/1965 | Hamblin | 60/284 |
| 3,260,566 | 7/1966 | Fisher | 60/284 |
| 3,297,400 | 1/1967 | Eastwood | 60/288 |
| 3,440,817 | 4/1969 | Sauffer | 60/288 |
| 3,503,714 | 3/1970 | Lang | 60/288 |

FOREIGN PATENTS OR APPLICATIONS

| 1,946,862 | 4/1971 | Germany | 60/288 |

Primary Examiner—Douglas Hart
Attorney—Quigg and Oberlin

[57] ABSTRACT

An oxidative catalytic converter comprising a shell, partitions within said shell which divide the interior into a plurality of sections which contain a catalyst material, an inlet to said shell, a valve located in said inlet which selectively admits gases passing through the converter to portions of the catalyst material in accordance with the gas flow rate or volume and/or temperature and an outlet from said shell for withdrawing gases therefrom.

6 Claims, 4 Drawing Figures

OXIDATIVE CATALYTIC CONVERTER

This invention relates to an oxidative catalytic converter.

To achieve the proposed 1975 U.S. automobile exhaust emission standards will probably require the employment of oxidative catalytic converters. Various designs for oxidative catalytic converters are known in the art; however, none of the designs to date provides an oxidative catalyst converter system which shortens the warm-up period of the catalyst converter during a maximum emission period which occurs during the start-up of a cold gasoline engine with extra rich fuel/air mixtures.

It is an object of this invention to provide an oxidative catalytic converter which rapidly reduces the hydrocarbon and carbon monoxide emissions that occur during start-up of a cold automobile engine. Another object is to provide an oxidative catalytic converter which directs inlet exhaust gases to a series of catalyst beds selectively and/or successively in accordance with the volume of exhaust gases passing into the converter and the catalyst beds. Still another object is to provide a converter which directs exhaust inlet gases away from the catalyst beds in accordance with the temperature of the catalyst beds. These and other objects will be apparent from the written description, the drawings and the appended claims.

According to this invention, an oxidative catalytic converter, designed to accomplish the aforesaid objects, comprises generally a shell containing partitions for dividing the interior of said shell into a plurality of sections containing beds of catalyst material. An inlet is attached to the shell upstream of the catalyst beds. The inlet contains a valve which directs the flow of exhaust gases through the catalyst beds selectively and/or successively in accordance with the rate of flow or volume of the exhaust gases in the inlet exhaust gas stream. The converter contains a suitable device for adjusting the direction of flow of the exhaust gas stream successively and selectively to the catalyst beds in order to obtain optimum conversion of hydrocarbon and carbon monoxide emission products contained in the exhaust gases. In a preferred embodiment of this invention, a differential pressure sensitive device is employed as the means of directing the exhaust gas flow selectively and/or successively to the catalyst beds. The shell contains a by-pass valve upstream of the catalyst beds which permits removal of the exhaust gases from the converter upstream of the catalyst materials. The converter contains a suitable device for adjusting the by-pass valve to an open or closed position depending upon the temperature of the catalyst beds. An outlet is connected to the shell downstream of the upstream by-pass valve and downstream of the catalyst beds for withdrawal of the exhaust gases from the converter.

The invention will be described in greater detail with reference to the accompanying drawing in which.

Figure 1:
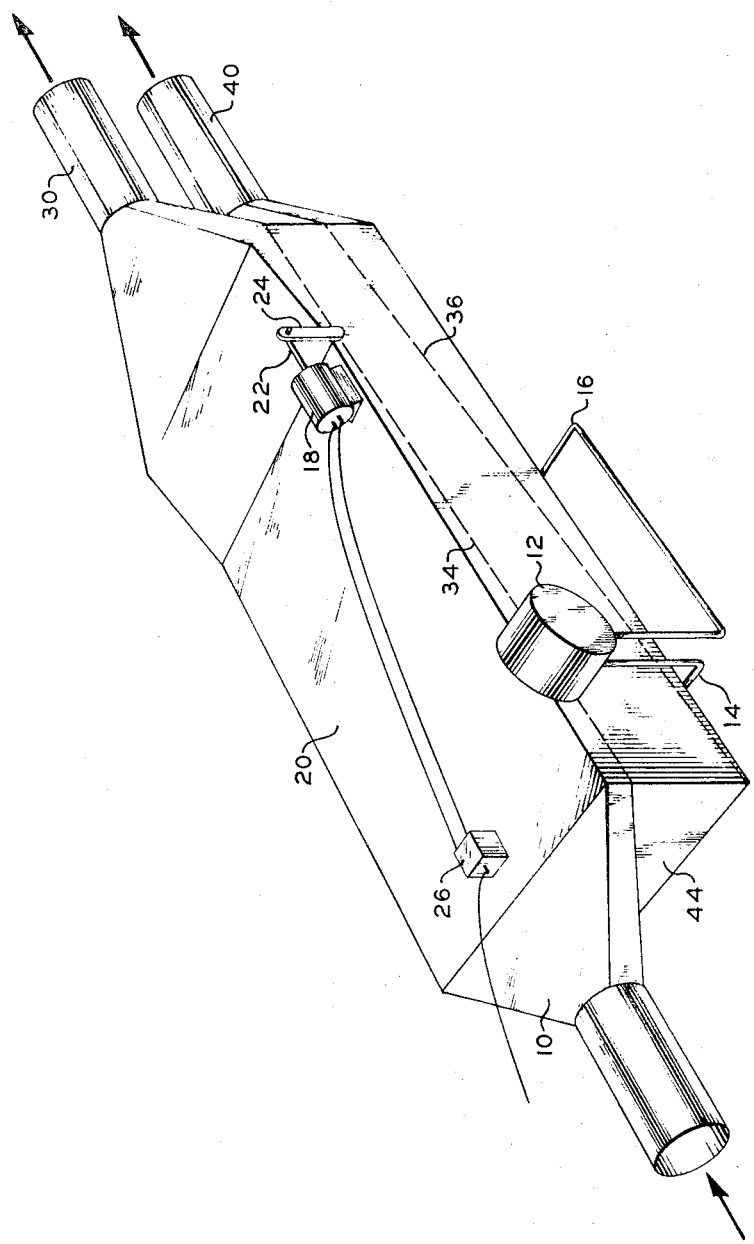
FIG. 1 is a perspective view of the principal elements of the oxidative catalytic converter.
Figure 2:
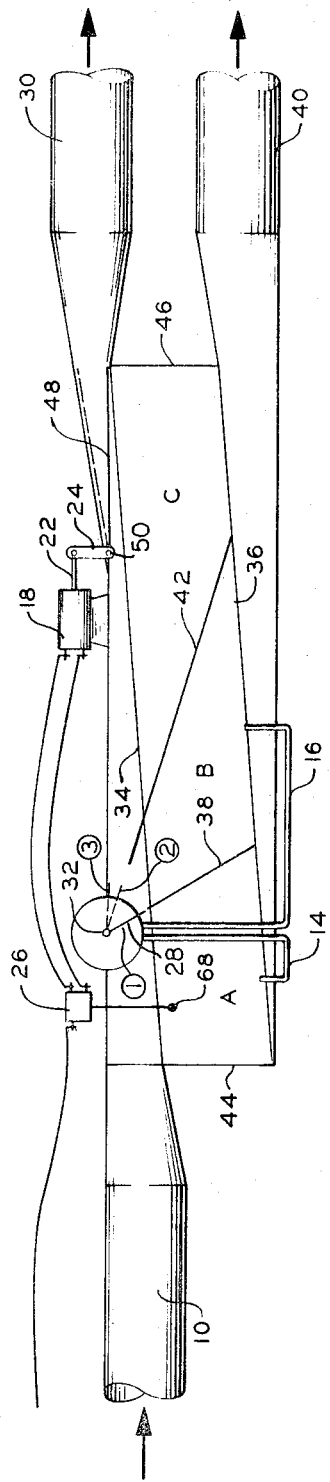
FIG. 2 is a cross-sectional view of an oxidative catalytic converter employing a differential pressure activated mechanical valve.
Figure 3:
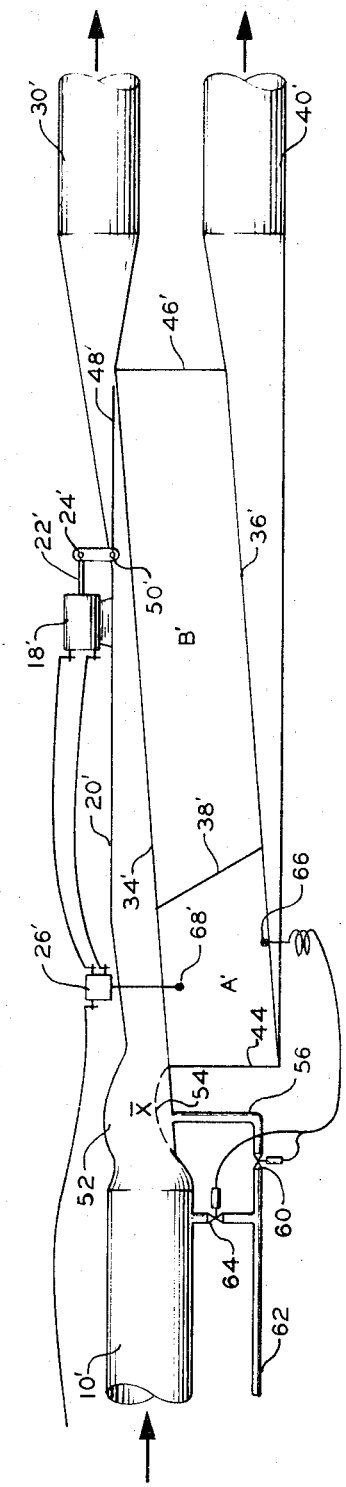
Figure 4:
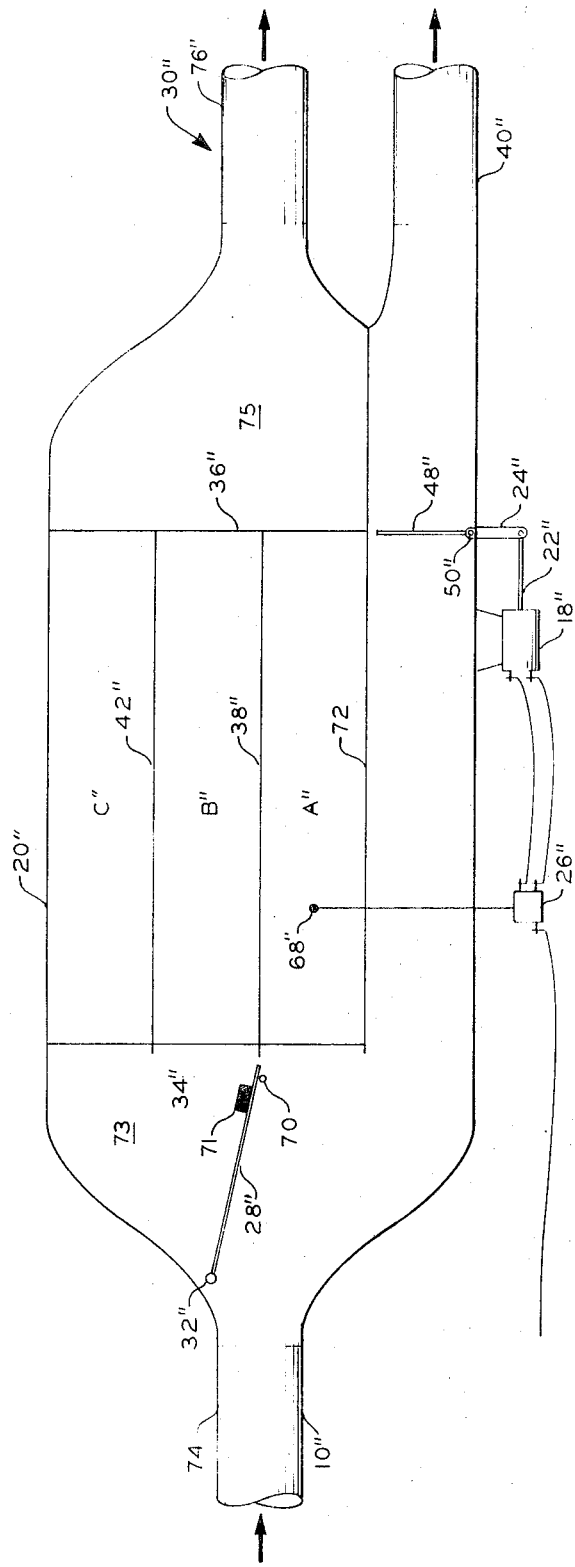

FIG. 3 is a cross-sectional view of an oxidative catalytic converter containing a differential pressure-operated gas flow valve: and FIG. 4 is a cross-sectional view of an oxidative catalytic converter containing a weight biased gas flow valve. Referring now to FIG. 1, an upstream inlet plenum chamber 10 is attached to a tubular shell 20. The tubular shell is attached to two downstream outlets plenum chambers 30 and 40. Shell 20 contains, in one embodiment of this invention, catalyst beds A, B and C, best seen in FIG. 2, and in another embodiment of this invention catalyst beds A' and B', best seen in FIG. 3. Attached to the side of shell 20 is a differential pressure measuring element 12 connected to catalyst bed A by tube 14 and to catalyst bed B by tube 16. A solenoid 18 is attached to shell 20. Solenoid 18 contains rod 22 pivotally mounted to connecting arm 24. A thermocouple activated switch 26 is attached to the shell 20, a thermocouple 68 located in catalyst bed A, an energy source (not shown) and to solenoid 18.

Referring to FIG. 2, a movable baffle 28 is pivotally mounted to shaft 32. An upstream perforate partition 34 and a downstream perforate partition 36 extend across the interior of shell 20. Imperforate partitions 38 and 42 extend between the base of valve baffle 28 and downstream perforate partition 36. The compartments formed by the sides of the shell, end 44 of shell 20, end 46 of shell 20, imperforate partitions 38 and 42, and perforate partitions 34 and 36 comprise catalyst compartments A, B and C which contain the oxidative catalyst material employed in the converter. A by-pass valve baffle 48 extends across the upstream interior of shell 20 and is pivotally mounted to shaft 50. Shaft 50 is connected to connecting arm 24.

Referring now to FIG. 3, a preferred embodiment of this invention is illustrated comprising an oxidative catalytic converter wherein the shell 20' contains an orifice 52, having a perforate section 54 therein which acts as a valve and directs the flow of inlet exhaust gases into catalyst sections A' and/or B'. The shell orifice perforate section 54 is connected to a tube 56. Tube 56 is connected to temperature actuated valve 60. The temperature actuated valve 60 is connected to vacuum line 62 connected to the intake manifold of an automobile engine (not shown). Upstream inlet 10' is connected to temperature actuated valve 64, which is connected to vacuum line 62. A thermostat 66 is located in catalyst bed A' in close proximity to catalyst A' perforate plate section 36'. Thermostat 66 controls the opened and closed positions of valves 60 and 64.

Referring now to FIG. 4, an oxidative catalytic converter is illustrated with an elongated tubular shell 20'' which is generally rectangular in shape. A perforate upstream end partition 34'' extends transversely across shell 20'', while a perforate downstream end partion 36'' also extends transversely across shell 20'' and is spaced apart from the upstream end partition 34''. Imperforate partitions, 72, 38'' and 42'' are spaced apart from each other and extend longitudinally of shell 20'' between end partitions 34'' and 36'' to form a plurality of sections containing catalyst beds A'', B'' and C''. The catalyst containing sections A'', B'' and C'' are stacked vertically within shell 20'', with section A'' being the lowermost of the sections. An inlet conduit means 10'' comprises an inlet plenum chamber 73 connected to the upstream end of shell 20'' and in communication with the upstream ends of the catalyst beds A'', B'' and C''; and an inlet conduit 74 connected to the upstream end of inlet plenum chamber 73. A diverting means is disposed in the inlet conduit means 10'' for controlling the admission of exhaust gases to the catalyst beds A'', B'' and C'' selectively in accordance with the velocity or flow rate of the exhaust gases. The diverting means comprises a valve in the inlet plenum chamber which is formed by movable baffle 28" pivotally mounted to shaft 32". The valve is provided with a biasing means which normally biases the valve to a position to admit the exhaust gases to only one, A", of the catalyst containing sections. The biasing means is illustrated as a weight 71 on vane 28" which normally holds vane 28" down in a position against a stop 70 to admit exhaust gases to bed A", the lowermost of the catalyst containing sections. An outlet conduit means 30" comprises an outlet plenum chamber 75 connected to the downstream of shell 20" and in communication with the downstream ends of catalyst containing sections A", B" and C"; and an outlet conduit 76 connected to the downstream end of the outlet plenum chamber 75. A second outlet exhaust gas conduit means 40" is in communication with the downstream end portion of shell 20" and the upstream end of catalyst beds A", B" and C", that is, plenum chamber 73, for withdrawing exhaust gases therefrom when the temperature in catalyst bed A" becomes excessive. The temperature in bed A" is measured by thermocouple 68", which is connected to switch 26". Switch 26" controls solenoid 18" to actuate rod 22", arm 24" and by-pass valve baffle 48". Valve baffle 48", which is pivotally mounted on shaft 50" and extends across the by-pass conduit, is opened by solenoid 18" when the temperature in bed A" becomes excessive.

In general, in the operation of the oxidative catalytic converter of this invention, automobile exhaust is introduced into the upstream inlet 10 of the converter at varying flow rates, e.g., from 10 to 110 standard cubic feet per minute or even as high as 400 standard cubic feet per minute, at varying temperatures, e.g., from 0° to 1,100°F or even in excess of 2,000°F, which contains varying amounts of hydrocarbons and carbon monoxide, e.g., carbon monoxide concentrations as high as 6–9 percent when the car is cold, decreasing to about 1 percent when the car exhaust is warm, and hydrocarbon contents of 1 percent or less. In accordance with the inlet pressure of the exhaust gases entering the upstream inlet 10, the exhaust gases are diverted selectively and/or successively to catalyst beds A, B, and C, etc., by a differential pressure valve baffle, as illustrated in FIG. 2, or the differential pressure orifice, as illustrated in FIG. 3. Each catalyst bed A, B, and C contains a suitable catalytic material such as noble metal catalysts or transition metal oxide catalysts. During initial start-up of the converter at low pressure, low flow rate, high carbon monoxide content and low inlet temperature, the exhaust gases are diverted selectively into catalyst bed A to optimize maximum transfer of thermal energy from the exhaust gas to a reduced or limited size catalyst mass, in order to provide for maximum conversion of hydrocarbons and carbon monoxide during initial start-up of the converter. Thermocouple 68 located in catalyst bed A is activated at exhaust gas inlet temperatures deleterious to the catalyst life, e.g., 1,600°F or above, to avoid or minimize overheating the catalytic material at elevated temperatures. The thermocouple is suitably associated with a switch 26, an energy source (not shown), a solenoid 18 suitably connected to a rod 22 which activates the valve 48 to an open or closed position. Under normal automobile driving conditions with by-pass valve 48 in a closed position, the inlet exhaust gas pressure increases and the gas flow rate increases as the engine speed increases. As the inlet exhaust gas pressure increases, referring now to FIG. 2, baffle 28 moves to position 2, thereby directing the increased thermal energy associated with the increased exhaust gas flow to both catalyst beds A and B at suitable oxidation temperatures, while concurrently restricting the exhaust gas flow from catalyst bed C. At maximum pressures, at exhaust gas temperatures which do not cause by-pass valve 48 to open, baffle 28 is moved to position 3 to permit exhaust gases to contact catalyst bed C.

Referring to FIG. 3, the various elements thereof, such as the thermocouple 68', thermocouple switch 26', solenoid 18', rod 22', connecting arm 24', by-pass valve 48', catalyst bed A' and catalyst bed B', function and operate in a comparable manner with their corresponding parts as described hereinbefore with respect to FIG. 2. Referring now to orifice 52 containing perforate section 54, the inlet exhaust gases during initial start-up of the catalytic converter at low pressure, high carbon monoxide and high hydrocarbon content, and low inlet temperatures are diverted into catalyst bed A' as the result of a vacuum applied through the perforate section 54 of orifice 52 by maintaining valve 60 in an opened position in communication with vacuum line 62 connected to the intake manifold of an automobile engine (not shown). The advantages in operating the converter and diverting the initial exhaust gases into catalyst chamber A' are the same advantages enumerated with respect to diverting the initial exhaust gases thorugh catalyst bed A previously discussed with reference to FIG. 2. Thermostat 66 located in catalyst bed A' down-stream in close proximity with the perforate partition 36' of catalyst bed A' is connected to valves 60 and 64. Thermostat 66 at normal exhaust gas temperatures, e.g., 950° to 1,250°F, activates valves 60 and 64 to a closed position. The closing of valves 60 and 64 removes the pressure differential in orifice 52 by removing the vacuum at perforate section 54 and directs the exhaust gases to catalyst beds A and B for efficient conversion of the exhaust gases into $H_2O$ and $CO_2$.

The operation of the oxidative catalytic converter of this invention based on the exhaust gas flow rates or pressures in combination with valves which divert the maximum thermal energy to the smallest catalyst bed volume in order to optimize conversion of hydrocarbons and carbon monoxide to water and $CO_2$, while providing for catalyst by-pass at temperatures at which the catalyst materials are destroyed, will suggest other modifications and alterations, of this invention which will be apparent to those skilled in the art. Accordingly, it is understood that this invention is not to be unduly limited in accordance with the foregoing drawings and-/or discussion.

I claim:
1. A catalytic converter, comprising:
a tubular shell;
partition means within said shell for dividing the interior of said shell into a plurality of sections containing beds of catalyst material;
inlet exhaust gas conduit means in communication with the upstream end portion of said shell and the upstream end of said catalyst beds for admitting exhaust gases thereto;
diverting means disposed in said inlet conduit means for controlling the admission of said gases to said catalyst beds selectively in accordance with the velocity or flow rate of said gases;

a first outlet exhaust gas conduit means in communication with the downstream end portion of said shell and the downstream end of said catalyst beds for withdrawing exhaust gases therefrom; and a second outlet exhaust gas conduit means in communication with the downstream end portion of said shell and the upstream end of said catalyst beds for withdrawing exhaust gases therefrom.

2. A catalytic converter in accordance with claim 1 wherein said diverting means comprises a valve disposed in said inlet conduit means.

3. A catalytic converter in accordance with claim 1 wherein said inlet conduit means comprises:
an inlet plenum chamber in communication with the upstream ends of said catalyst beds;
an inlet conduit connected to said inlet plenum chamber; and
said diverting means comprises a valve disposed in said inlet plenum chamber.

4. A catalytic converter according to claim 1 wherein:
said tubular shell is elongated and is generally rectangular in shape;
said partition means comprises a perforate upstream end partition extending transversely across said shell, a perforate downstream end partition extending transversely across said shell and spaced apart from said upstream end partition, and a plurality of spaced apart imperforate partitions extending longitudinally of said shell between said end partitions to form said plurality of said catalyst containing sections;

said inlet conduit means comprises an inlet plenum chamber connected to the upstream end of said shell and in communication with the upstream ends of said catalyst containing sections, and an inlet conduit connected to the upstream end of said inlet plenum chamber;

said diverting means comprises a valve disposed in said inlet plenum chamber; and said second outlet exhaust gas conduit means comprises an outlet plenum chamber connected to the downstream end of said shell and in communication with the downstream ends of said catalyst containing sections, and an outlet conduit connected to the downstream end of said outlet plenum chamber.

5. A catalytic converter according to claim 4 wherein said valve is provided with a biasing means which normally biases said valve to a position to admit said exhaust gases to only one of said catalyst containing sections.

6. A catalytic converter according to claim 5 wherein:
said catalyst longitudinally extending containing sections are stacked vertically within said shell;
said biasing means comprises weight means which normally holds said valve in a position to admit exhaust gases to the lowermost of said catalyst containing sections.

* * * * *

UNITED STATES PATENT OFFICE
CERTIFICATE OF CORRECTION

Patent No. 3,783,619　　　　　　　　　Dated January 8, 1974

Inventor(s) Henry E. Alquist

It is certified that error appears in the above-identified patent and that said Letters Patent are hereby corrected as shown below:

Column 6, line 11, "second" should read -- first --.

Signed and Sealed this

Thirtieth Day of November 1976

[SEAL]

Attest:

RUTH C. MASON  
Attesting Officer

C. MARSHALL DANN  
Commissioner of Patents and Trademarks